United States Patent Office 3,223,353
Patented Dec. 14, 1965

3,223,353
APPARATUS FOR DESTINATION CONTROL OF A CONVEYANCE BY MEANS OF HALL GENERATORS
Friedrich Kuhrt, Hans Joachim Lippmann, and Klemens Wiehl, all of Nurnberg, Germany, assignors to Siemens-Schuckertwerke Aktiengesellschaft, Berlin-Siemensstadt, Germany
Filed Dec. 27, 1963, Ser. No. 333,840
Claims priority, application Germany, Dec. 28, 1962, S 83,083
6 Claims. (Cl. 243—29)

Our invention relates to control systems for selectively guiding a conveyance to a selected one of a number of destinations by magnetically coding the conveyance at the outset, and particularly although not exclusively to such a control system for guiding cylindrical carriers which are pneumatically propelled within tubular conduits of their proper destinations.

Destination control systems using Hall generators to sense magnetic signals coded upon the conveyance, so as to produce corresponding signal voltages for control devices have been proposed. Such a system is discussed in application Serial No. 93,832, filed March 2, 1961, and assigned to the assignee of this application.

An object of the present invention is to provide an improved system of this type, which assures more accurate decoding of code signals than hitherto possible.

A more particular object of the invention is to provide such an improved system for tubular carriers or containers wherein the magnetic information impregnated thereon can be sensed independent of the conveyance speed and despite roll of the conveyance about its long axis relative to the tubular conduit within which it travels.

According to a feature of our invention, we provide the conveyance with a plurality of magnetizable information bands extending perpendicular to the direction of movement and supplement the information bands with permanently magnetized timing bands also extending transverse to the direction of movement but located fore and aft of the plurality of information bands. We then mount in the sensor positions upon the conveyor a plurality of Hall-generator sensors corresponding in number to the information and timing bands.

According to another feature of the invention, the conveyance constitutes a tubular transport carrier and the conveyor constitutes a pneumatic conduit. We then provide the bands over at least a portion of the perimeter of the carrier, although we contemplate also mounting them around the entire perimeter. The angle about which each band extends on the carrier depends upon the degree of roll which is expected of the cylindrical carrier or conveyance about its long axis during passage through the conduit.

According to another feature of the invention, we temporarily induce the magnetic information signals upon the information bands, and permanently magnetize the permanent-magnet peripherally extending timing bands, parallel to the direction of motion. We then arrange the timing bands to switch on the information evaluation system at the sensing stations only when the information bands attain their assigned positions relative to the corresponding sensing heads, as indicated by the timing bands reaching their positions opposite their sensing heads.

The signals produced in each Hall sensing head by one band passing it are not unambiguously positive or negative, but produce two small maxima of one polarity and a full maximum of opposite polarity. Thus variations in the distance between the conveyance and the sensing heads may produce false output signals in the sensing heads. However, according to the invention, the sensed information signals are evaluated only when the timing bands also produce signals in their corresponding sensing heads, so that such errors may be minimized. According to a further feature of the invention, these errors are minimized even more by minimizing the code evaluating time to a narrower time period as will be explained.

Other features, objects, and advantages of the invention will become obvious from the following detailed description of the invention when read in connection with the accompanying drawings wherein:

FIG. 1 illustrates a tube conveyance or carrier for travelling in a tube conveyor or conduit and embodying features of the invention. FIGS. 1a and 1b show the relative positions of bands and sensing heads for other embodiments of the invention.

FIG. 2 constitutes three adjacent voltage-distance diagrams showing the simultaneous excursion of the Hall-voltage signals of three adjacent Hall sensing heads as they are passed by their respective assigned information bands upon the conveyance travelling along the conveyor.

FIG. 3 constitutes five adjacent voltage-distance diagrams illustrating the voltage output of five adjacent Hall-voltage generators at sensing positions as they are passed respectively by two timing bands and three intermediate information bands according to the invention.

Figure 1:
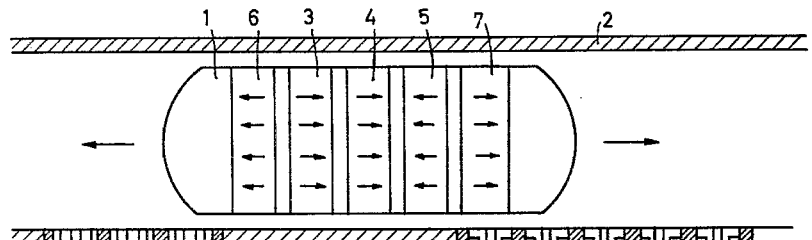

In FIG. 1, a cylindrical conveyance or carrier 1 is propelled pneumatically in a tubular conveyor or conduit 2.

The members 1 and 2 form part of a conveyor system, whose basic principles are known. Generally the conduit 2 has a number of terminals or destinations to which the carrier 1 may be dispatched from a sending station depending upon the particular information magnetically coded into the carrier. At predetermined sensing points along the conduit, sensors read the coded signals and gate the conduit according to the signals so the carrier travels toward the proper terminal. Conveyor systems are discussed in the application Serial No. 93,832, filed March 2, 1961.

The tubular carrier conveyance 1 possesses three information bands 3, 4 and 5 extending peripherally about its cylindrical shape as well as two signal bands 6 and 7 also extending peripherally and magnetized in a direction longitudinal to the travel path. The information bands 3, 4, 5 are magnetized transversely to their length by three signal input heads 8, 9 and 10 which are built into the carrier tube at the desired control or sensing station. The heads comprise conventional U-shaped iron cores 11 and coils 12 which are energized by means of currents selectively controlled in dependence upon the desired destination.

The bands preferably consist of a magnetic alloy known by the trademark "Vicalloy." This alloy has a coercive strength of approximately 300 oersteds and a remanent induction of about 10,000 gauss. The permanent magnet timing bands are magnetized across their respective lentghs in opposite directions.

Mounted at the pickup points of the conduit 2 are three known pickup heads 13, 14 and 15 each having a Hall generator for sensing information bands 3, 4 and 5 respectively and two heads 16 and 17 for sensing the timing bands 6 and 7. The sensing heads each include a pair of magnetic pole shoes with a Hall generator sandwiched therebetween.

The Hall output voltage of the sensing heads 13, 14 and 15 passes to a signal evaluating circuit 20 which by means of logic elements produces a control signal for the individual switching shunts and their particular control apparatuses in the tubular conduit. Since each sensing head is capable of producing either a positive or negative signal, three information bands can generate collectively eight different signal combinations.

Information evaluation is made to occur only when both sensing heads 16 and 17 are energized simultaneously by the magnetic field of the timing bands 6 and 7 and simultaneously release the necessary control signals. For this purpose, coincidence circuit 21, operating only in response to correct signals from generators 16 and 17 opens the apparatus 20 for passage of information signals.

Figure 2:
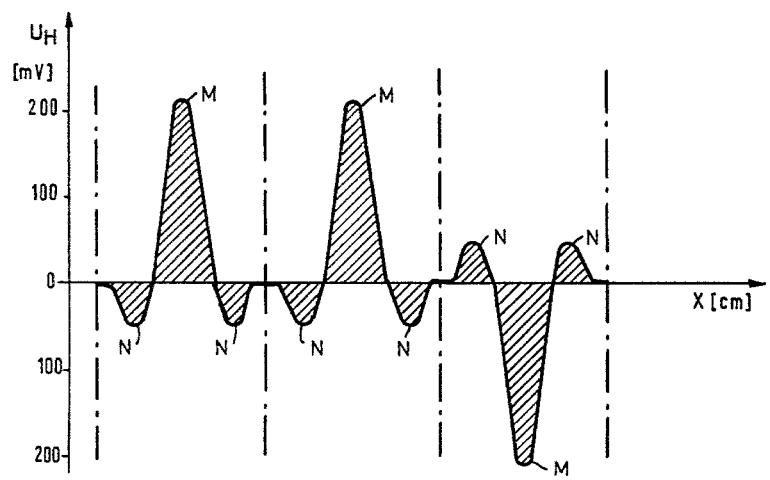

FIG. 2 illustrates the output voltage $V_H$ of three Hall generator sensing heads 13, 14 and 15 as they sense their assigned bands 3, 4 and 5 respectively in dependence upon the path X of the transport conveyance 1.

The spacing between the adjacent ordinates corresponds to the spacing between the sensing heads 13, 14, 15. Each band in passing its assigned generator produces three maxima. The first (small) maximum N occurs when the leading pole of the band passes one pole shoe of the corresponding Hall generator. The middle (main) maximum M occurs when the leading and lagging poles of the same band are opposite respective pole shoes at the same Hall generator. The third (small) maximum N occurs when the lagging pole of the same band passes by one pole shoe of the same Hall generator. Corresponding to the magnetization assumed in FIG. 1 for the bands 3, 4 and 5 passage of the carrier 1 past the sensing points produces two positive and one negative main maxima M. Depending upon the distance of the conveyance from the sensing heads, the individual maxima M and small maxima N have various values so that the evaluating and control system must consider the possibility of false signals.

According to the invention, the possibility of false signals is minimized by means of the timing bands. These cause the gate 21 to issue an output signal only during the short period when both poles of both bands 6, 7 are opposite both pole shoes of both generators 16, 17, namely only during the period when both generators 16, 17 have their main maxima outputs. FIG. 3 again illustrates the three middle pulses corresponding to the signals produced by the information bands 3, 4, 5 as they pass the corresponding Hall-voltage pickup heads 13, 14, 15. The extreme right and left pulses $T_1$ and $T_2$ correspond to the signals produced on the sensing heads 16 and 17 by the timing bands 6 and 7. Correspondingly adjusting the AND-gates, and if necessary adding threshold value devices, assures release of the information evaluation only in the range of the main maxima timing signals so that the pickups exhibit the desired correct signals of the information bands.

According to another embodiment of the invention the range of positions during which information output can occur is further narrowed by locating the timing bands 6 and 7 so that they are slighlty displaced, outwardly or inwardly, relative to the normal positions they would occupy opposite the pickup heads 16 and 17 when the information bands 3, 4 and 5 are opposite to the pickups 13, 14 and 15. The displacemennt is only great enough to reduce the travel range (of carrier 1) during which the main maximum signal from pickup 16 coincides with the main maximum from pickup 17, but not great enough to prevent coincidence altogether.

Figure 1A:
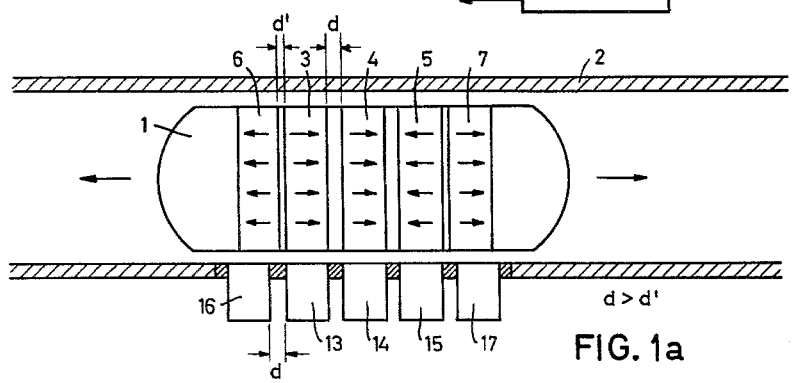
Figure 1B:
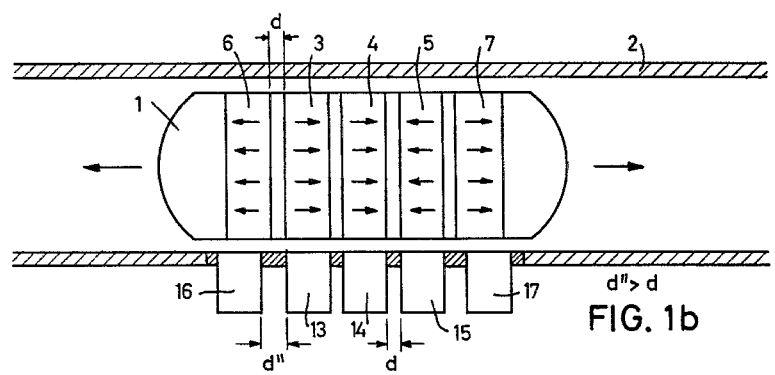

For example the distance $d'$ of the timing bands from the information bands in one embodiment is slightly smaller than the distance $d$ of the information bands from each other, while maintaining an equal distance $d$ between the sensor heads 13 to 17. This is shown in FIG. 1a. Alternately, the interband distance is maintained equal to $d$ for all the bands and for the information sensors 13 to 15. The sensing heads 16 and 17 corresponding to the timing bands are then moved outwardly to a distance $d''$ so as to reduce the coincidence time during which the information bands are evaluated. This is shown in FIG. 1b.

Figure 3:
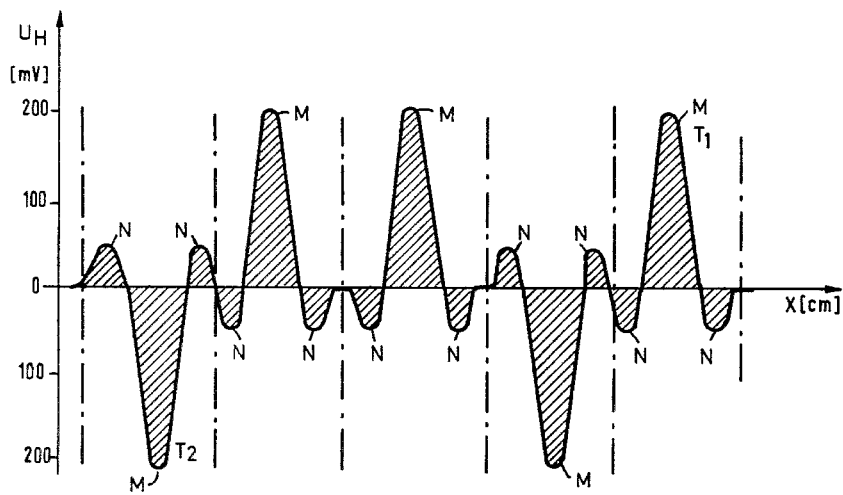

In FIG. 3, the ordinates are spaced from each other equally, corresponding to the spacing between sensing heads. The signals induced by the information bands are at a greater distance from each other than are the main maxima of the timing signals relative to the adjacent information signals. Because the coincidence conditions for release of information are fulfilled for only a short period of time, the operating accuracy for evaluation is increased.

Figure 4:
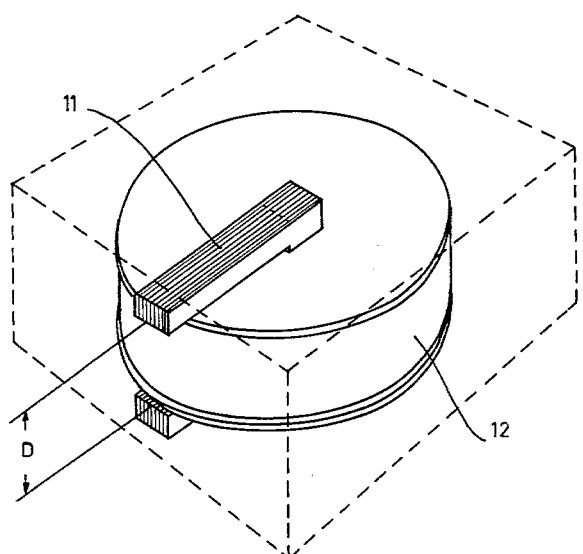
FIG. 4 is a partially schematic and partially perspective diagram of the detailed construction of the coding heads in FIG. 1.
Figure 5:
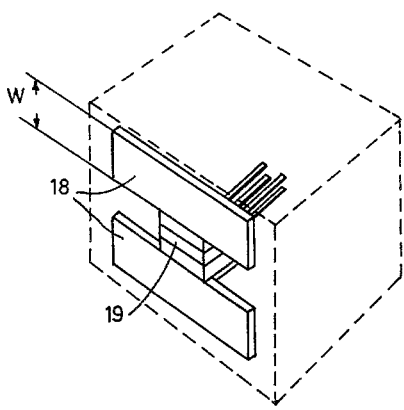
FIG. 5 is a partially schematic and partially perspective diagram illustrating the Hall-generator pickup heads of FIG. 1.

FIGS. 4 and 5 show the detailed construction of the writing heads 8, 9 and 10 and the read-out heads 13 to 17. In both cases the broken line represents the screen housing. The distance D between the pole shoes of the writing head (FIG. 4) constitutes approximately 15 millimeters and the width W of the pole shoes of the sensing heads (FIG. 5) is 10 millimeters.

Figure 6:
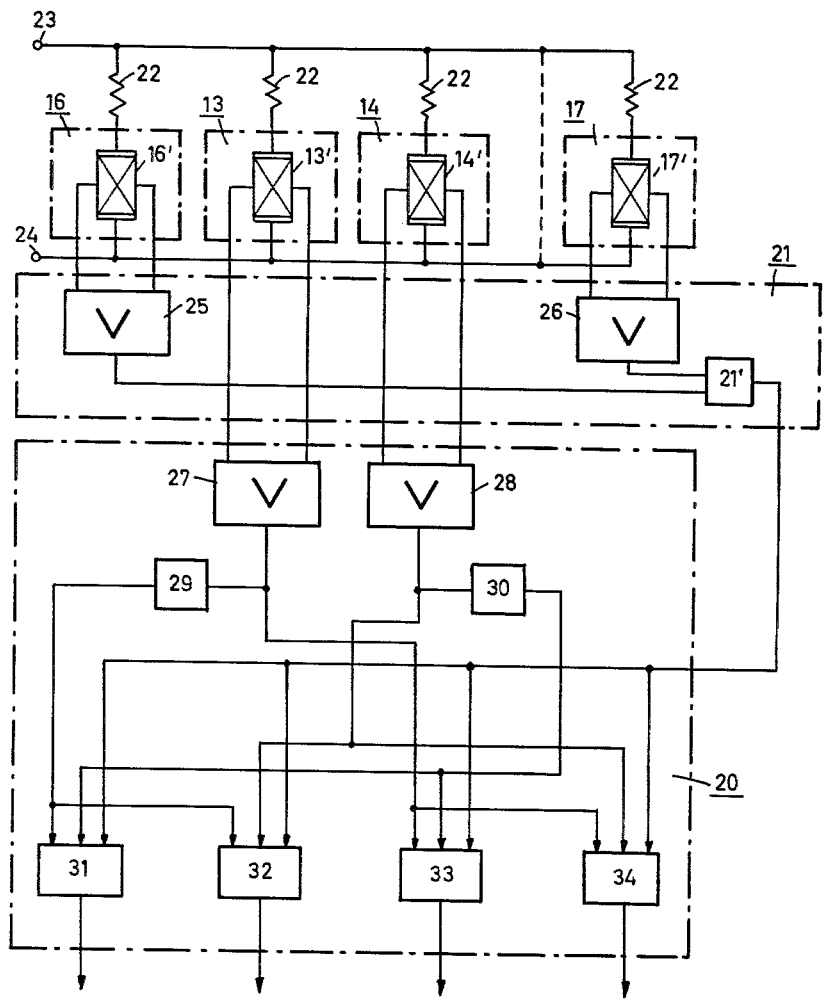
FIG. 6 is a block diagram illustrating the code evaluating circuit for the signals produced by the Hall generators in FIG. 1.

FIG. 6 shows the details of the sensing apparatus 20. For simplicity apparatus 20 is shown evaluating only the signals of two sensing heads 13 and 14. A direct-voltage network 23, 24 furnishes the Hall plates 13', 14', 16' and 17' of respective Hall generators 13, 14, 16 and 17 with control currents through resistance 22. The Hall voltages pass to the circuit 21 which possesses individual amplifiers 25, 26 to amplify the Hall voltages of the Hall devices 16 and 17 and an AND-gate 21' that serves for releasing the evaluating network 20. Correspondingly, the Hall voltages from Hall generators 13 and 14 pass to amplifiers 27 and 28 in the circuit 20. The amplifiers 25 to 28 possess trigger stages so that they release signals only when the respective Hall voltage outputs have the right polarity. The invention also contemplates the amplifiers 25, 26 having threshold means for eliminating input voltages having less than a predetermined input value.

The response sensitivity of the triggers in amplifiers 25 and 26, whose output voltages are applied to AND-gate 21', is such that the information signals are released only in the maximum (M) range of the timing signals, assuring occurrence of the desired correct signals of the sensing heads corresponding to the information bands.

The output of the amplifiers 27 and 28 connect directly to AND-gates 33, 34 and 32, 34 respectively. Amplifiers 27, 28 connect over NOT-gates 29 and 30 to AND-gates 31, 32 and 31, 33 respectively. Each AND-gate 31, 32, 33, 34 has three inputs, the third input being a release signal from the AND-gate 21. Thus there is assured that each magnetization combination of the information band produces only an AND-signal and only when the timing bands simultaneously open the AND-gates 31 to 34. Suitable control apparatuses, for example magnetic valves and the like, are connected to the AND-gates 31 to 34 by means of power amplifiers for guiding the carrier 1.

Figure 7:
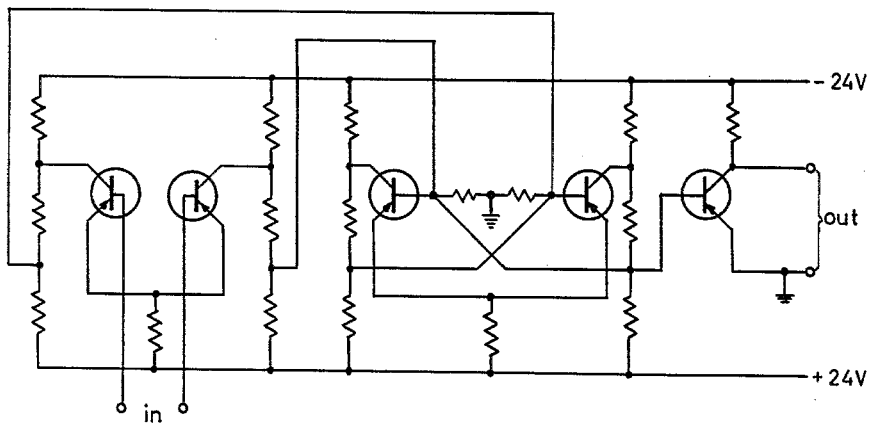
FIGS. 7 and 8 are schematic diagrams of circuits corresponding to blocks in FIG. 6.
Figure 8:
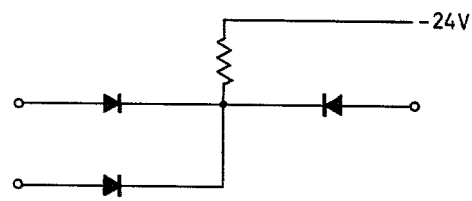

FIG. 7 schematically illustrates a circuit corresponding to amplifiers 25, 26, 27 and 28. FIG. 8 is an AND-gate corresponding to gate 21'.

The invention is suitable not only for cylindrical but also for other variously formed transport conveyances. With box-shaped containers to be used as conveyors corresponding bands can for example be applied to one of the side surfaces.

It will be obvious to those skilled in the art that the invention may even be practiced otherwise without departing from its spirit and scope.

We claim:
1. For a transportation system having a conveyance capable of travelling along paths to a number of destinations, a control system comprising a plurality of magnetizable information bands on said conveyance oriented transverse to the travel path, two timing bands oriented transverse to the travel path and respectively located on said conveyance on either side of said plurality of information bands, a plurality of Hall-generator sensor means each corresponding to one of said bands and located along said path for sensing the respective bands simultaneously when said conveyance passes them, electronic gate means connected to said sensor means for passing signals sensed by the sensors corresponding to the information bands only when said sensors corresponding to the timing bands sense the timing bands simultaneously.

2. For a pneumatic transportation system having a cylindrical conveyance capable of travelling within a cylindrical path to a number of destinations, a control system comprising a plurality of magnetizable information bands surrounding the periphery of said conveyance and oriented transverse to the travel path, two timing bands oriented transverse to the travel path and respectively located about said cylindrical conveyance on either side of said plurality of information bands, a plurality of Hall-generator sensor means each corresponding to one of said bands and located along said path for sensing the respective bands simultaneously when said conveyance passes them, electronic gate means connected to said sensor means for passing signals sensed by the sensors corresponding to the information bands only when said sensors corresponding to the timing bands sense the timing bands simultaneously.

3. For a transportation system having a cylindrical conveyance capable of travelling along its axis through a cylindrical path to a number of destinations, a control system comprising a plurality of magnetizable information bands on said conveyance oriented transverse to the travel path and embracing a portion of the periphery of said conveyance, said portion corresponding to the expected roll of said conveyance within the cylindrical conveyor, two timing bands oriented transverse to the travel path and respectively located on said conveyance on either side of said plurality of information bands and embracing a portion of the periphery of said conveyance, a plurality of Hall-generator sensor means each corresponding to one of said bands and located along said path for sensing the respective bands simultaneously when said conveyance passes them, electronic gate means connected to said sensor means for passing signals sensed by the sensor corresponding to the information bands only when said sensors corresponding to the timing bands sense the timing bands simultaneously.

4. For a transportation system having a conveyance capable of travelling along paths to a number of destinations, a control system comprising a plurality of magnetizable information bands on said conveyance oriented transverse to the travel path, two timing bands oriented transverse to the travel path and respectively located on said conveyance on either side of said plurality of information bands, a plurality of Hall-generator sensor means each corresponding to one of said bands and located along said path for sensing the respective bands simultaneously when said conveyance passes them, electronic gate means connected to said sensor means for passing signals sensed by the sensors corresponding to the information bands only when said sensors corresponding to the timing bands sense the timing bands simultaneously, said sensor means being arranged equidistant from each other, said information bands being arranged a distance from each other corresponding to the distance between said sensing means, the timing bands being spaced from the information bands by a distance smaller than the distance between the information bands from each other.

5. For a transportation system having a conveyance capable of travelling along paths to a number of destinations, a control system comprising a plurality of magnetizable information bands on said conveyance oriented transverse to the travel path, two timing bands oriented transverse to the travel path and respectively located on said conveyance on either side of said plurality of information bands, a plurality of Hall-generator sensor means each corresponding to one of said bands and located along said path for sensing the respective bands simultaneously when said conveyance passes them, electronic gate means connected to said sensor means for passing signals sensed by the sensors corresponding to the information bands only when said sensors corresponding to the timing bands sense the timing bands simultaneously, said timing bands and information bands being spaced equidistant from each other, said sensing means for said information bands being spaced a distance from each other corresponding to the distance between said bands, said sensing means for said timing bands being spaced from said sensing means for said information bands a distance greater from the information sensing means than the distance between the bands.

6. For a transportation system having a conveyance capable of travelling along paths to a number of destinations, a control system comprising a plurality of magnetizable information bands on said conveyance oriented transverse to the travel path, two timing bands oriented transverse to the travel path and respectively located on said conveyance on either side of said plurality of information bands, a plurality of Hall-generator sensor means each corresponding to one of said bands and located along said path for sensing the respective bands simultaneously when said conveyance passes them, electronic gate means connected to said sensor means for passing signals sensed by the sensors corresponding to the information bands only when said sensors corresponding to the timing bands sense the timing bands simultaneously, said information bands being spaced from each other so as to face and coincide with their corresponding sensing means simultaneously as said conveyance passes said sensing means, said sensing means for said timing bands and said timing bands being positioned so that when said information bands are opposite their corresponding sensing means the bands are symmetrically displaced from their corresponding sensing means but within the pickup range of said sensing means.

References Cited by the Examiner
UNITED STATES PATENTS

| | | | |
|---|---|---|---|
| 2,877,718 | 3/1959 | Mittag | 243—16 |
| 3,055,612 | 9/1962 | Stout | 243—16 |
| 3,069,111 | 12/1962 | Cork | 243—16 |
| 3,152,256 | 10/1964 | Zuck | 198—38 |
| 3,173,533 | 3/1965 | Zuck | 198—38 |

SAMUEL F. COLEMAN, *Primary Examiner.*

ANDRES H. NIELSEN, *Examiner.*